(12) United States Patent
Fajardo

(10) Patent No.: US 6,288,316 B1
(45) Date of Patent: Sep. 11, 2001

(54) MUSICAL NOTATION SYSTEM

(76) Inventor: Luis A. Fajardo, 2620 Ivan Hill Ter., Los Angeles, CA (US) 90039-2715

( * ) Notice: Subject to any disclaimer, the term of this patent is extended or adjusted under 35 U.S.C. 154(b) by 0 days.

(21) Appl. No.: 09/662,416

(22) Filed: Sep. 14, 2000

(51) Int. Cl.[7] ..................................................... G09B 15/02
(52) U.S. Cl. ...................... 84/483.2; 84/483.1; 84/470 R; 84/478; 434/236; 434/430
(58) Field of Search ............................... 84/483.2, 483.1, 84/470 R, 477 R, 478; 434/236–237, 238, 430, 309

(56) References Cited

U.S. PATENT DOCUMENTS

| | | | |
|---|---|---|---|
| 110,719 | * | 1/1871 | Zimmermann ....................... 84/483.2 |
| 1,313,015 | * | 8/1919 | Reeve .................................. 84/483.2 |
| 1,551,819 | * | 9/1925 | Gibsson .............................. 84/483.1 |
| 5,549,029 | * | 8/1996 | Lepinski .............................. 84/483.2 |

FOREIGN PATENT DOCUMENTS

446886 * 3/1949 (IT) .

* cited by examiner

Primary Examiner—Shih-Yung Hsich

(74) Attorney, Agent, or Firm—David A. Belasco; Beehler & Pavitt

(57) ABSTRACT

The system of musical notation includes a series of alphabetic characters "C", "D", "E", "F", "G", "A" and "B" representing tones C through B, and a series of alphabetic characters "H", "I", "J", "K" and "L" representing tones C♯ (D♭), D♯ (E♭), F♯ (G♭), G♭ (A♭) and A♯ (B♭), respectively. A timing grid is divided horizontally into an upper register section, a middle register section and a lower register section. The middle register section accommodates characters A, L, B, C, H, D, I and E, with character C representing the middle C tone of a keyboard instrument. The upper register section accommodates characters representing tones higher in pitch than tone E, the lower register section, accommodates characters, representing tones lower in pitch than tone A. The grid is divided vertically into horizontal intervals equal to the number of beats per measure. The characters are arranged horizontally upon the grid such that the relative timing of the tones is illustrated by their horizontal position with respect to the intervals. The characters are arranged vertically upon the grid such that tones of higher pitch are placed above tones of lower pitch. The grid is divided vertically to indicate the duration of measures and half measures. Apostrophe markings are placed above those characters between which a tone is to be sustained. Slash "/" markings are located in the intervals in which a rest is to be sustained. "tr" characters are located above those characters employed in a trill.

9 Claims, 2 Drawing Sheets

MUSICAL NOTATION SYSTEM

FIELD OF INVENTION

The invention pertains to systems of musical notation. More particularly, the invention relates to systems designed for use in teaching music employing simplified notation relating to half-tones, meter, key, and chord structure.

BACKGROUND OF THE INVENTION

Various systems have been developed to simplify musical notation in attempts to assist students to translate the notation into musical performance. U.S. Pat. No. 391,887 issued to Fallon incorporates consonants to identify sounds of the notes, dots, and rests, while the vowels designate the life of the consonants, that is, the duration of or value of the sound or note. The 12 chromatic sounds of an octave are represented by the 12 consonants B, D, F, G, Y, L, Ch, N, V, R, S, and T, in the order given. Application of the different alphabetical characters in writing a piece of music is as follows: the respective characters designating the tones of the music and the duration are written on a real or imaginary straight horizontal line from left to right. Consonants or notes receive their duration by writing the respective vowels alongside of the consonant.

U.S. Pat. No. 5,540,132 issued to Hale, is directed to a method and apparatus for teaching musical notation to young children. Each note is associated with a distinctly identifiable color, which is in turn associated with an object that naturally occurs in this color. Each object, in turn, is associated with a cartoon character by color, the first letter of the name and the shape. Each character is endowed with a distinctly identifiable personality characteristic that enables the child to utilize the cartoon character in an educational activity. U.S. Pat. No. 682,015, issued to Adams is a simplified notation for musical tones employing a three line staff for a more compact arrangement and using conventional notes with strike through lines to indicate relative pitch on the abbreviated staff. This system uses conventional note types (full, half, quarter, etc.) to indicate relative timing of tones.

U.S. Pat. No. 4,277,090 issued to Lusi uses a composite musical staff of at least two sets of five equally spaced lines each, the two sets of lines forming a composite treble-bass clef staff. Conventional notation is used with this composite staff, designed to simplify orchestral scoring. U.S. Pat. No. 5,574,238 issued to Mencher is a simplified method of musical notation for keyboard instruments designed to enable easier sight-reading and playing of music. Each octave is represented by five lines, each of a different color, to match color tags of the corresponding five black keys of each octave of the keyboard. Each of the lines represents a half-tone and each space on either side of the lines represents a whole tone of an octave on a keyboard.

While other variations exist, the above-described designs for musical notation systems are typical of those encountered in the prior art. It is an objective of the present invention to provide for a system of musical notation that permits identification of each tone to be played through a single, easily identified character. It is a further objective to provide such identification without reference to positional location of the character, as with conventional musical notation. It is a still further objective of the invention to provide for identification of half-tones through unique, consistent characters. It is yet a further objective to identify the timing and duration of tones through a positioning grid, illustrating the relative relationship of tones to each other without using different symbols (half notes, eight notes, etc.) for the same tone. It is still another objective to differentiate those tones played with the left hand from those played with the right hand through graphical features. Finally, it is an objective of the invention to provide a simplified means for displaying chords and permitting the musician to explore chord inversions.

While some of the objectives of the present invention are disclosed in the prior art, none of the inventions found include all of the requirements identified.

SUMMARY OF THE INVENTION

The present invention involves a system of musical notation. It includes a series of alphabetic characters "C", "D", "E", "F", "G", "A" and "B" representing tones C through B, respectively, and a series of alphabetic characters "H", "I", "J", "K" and "L" representing tones C♯ (D♭), D♯ (E♭), F♯ (G♭), G♯ (A♭) and A♯ (B♭), respectively. A timing grid is provided.

The grid is divided horizontally into an upper register section, a middle register section and a lower register section. The middle register section accommodates characters A, L, B, C, H, D, I and E, with character C representing the middle C tone of a keyboard instrument. The upper register section accommodates characters representing tones higher in pitch than tone E. The lower register section accommodates characters representing tones lower in pitch than tone A.

The grid is divided vertically into horizontal intervals. The number of the intervals is equal to the number of beats per measure of a musical composition. The characters, C through B and H through L, are laid out horizontally upon the grid such that the relative timing of the characters is illustrated by the position of the characters with respect to the intervals. The characters that occur earlier are placed to the left of subsequently occurring characters and are laid out vertically upon the grid such that characters representing tones of higher pitch are placed above those representing tones of lower pitch.

A variation of the invention further divides the grid vertically to indicate a beginning and an end of each measure.

Another variation of the invention further divides the grid vertically to indicate a beginning and an end of each half measure.

An additional variation of the invention further includes a series of apostrophe markings. The markings are located above those characters between which a tone is to be sustained.

An added variation of the invention further includes a series of slash "/" markings. The / markings are located in the horizontal intervals in which a rest is to be sustained.

In a further variation of the invention, a trill is indicated by a lower case alphabetic character "tr" located above those characters employed in the trill.

In yet another variation of the invention, the characters representing tones higher in pitch than the third F above middle C, are indicated by a lower case alphabetic characters "g" through "f" and "k" through "j". The characters are located upon the grid beginning at the same vertical displacement as the characters "C" through "F" representing tones beginning with the second C above middle C. Characters represented by tones higher in pitch than the fourth F above middle C are indicated by underscored lower case alphabetic characters "g" through "c" and "k" through "l". The underscored characters are also located upon the grid beginning at the same vertical displacement as the characters "C" through "F" representing tones beginning with the second G above middle C.

In still another variation of the invention, the characters representing tones lower in pitch than the third A below middle C are indicated by lower case alphabetic characters "g"through "a" and "j" through "l". The characters are located upon the grid beginning at the same vertical displacement as the characters "G" through "A" representing tones beginning with the second G below middle C.

In a final variation, tones to be played with the left hand are indicated by characters in bold type.

DETAILED DESCRIPTION OF THE PREFERRED EMBODIMENTS

Figure 1:
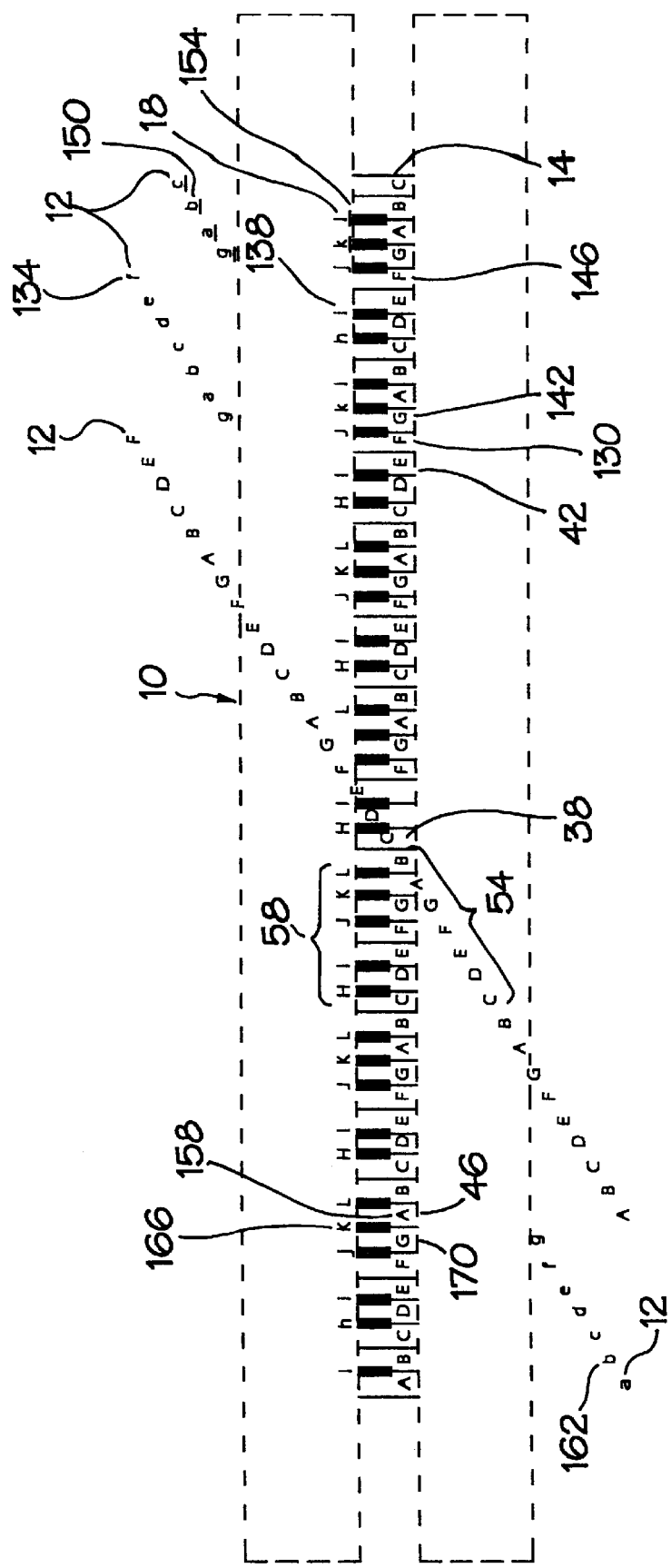
FIG. 1 is a view of the invention's alphabetical characters arranged according to tones on a keyboard instrument.
Figure 2:
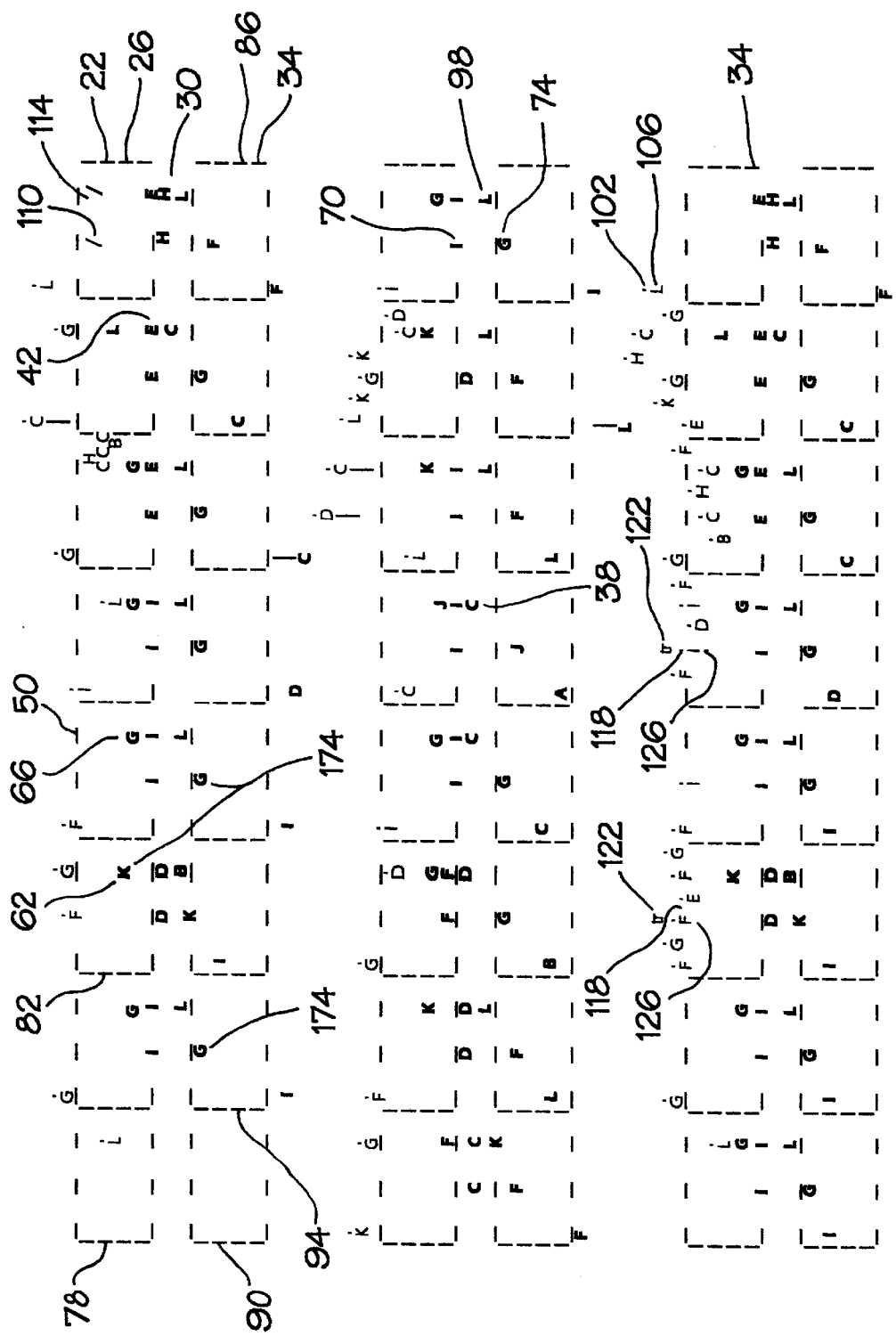
FIG. 2 is a view of the preferred embodiment of the invention with the alphabetical characters arranged on the timing grid in a portion of a sample composition.

As illustrated in FIGS. 1 and 2, the present invention involves a system of musical notation 10. It includes a series of alphabetic characters "C", "D", "E", "F", "G", "A" and "B" representing tones C through B 14, respectively, and a series of alphabetic characters "H", "I", "J", "K" and "L" representing tones C♯ (D♭), D♯ (E♭), F♯ (G♭), G♭ (A♭) and A♯ (B♭), respectively.

As illustrated in FIG. 2, a timing grid 22 is provided. The grid 22 is divided horizontally into an upper register section 26, a middle register section 30 and a lower register section 34. The middle register section 30 accommodates characters A, L, B, C, H, D, I and E 38, with character C representing the middle C tone of a keyboard instrument. The upper register section 26 accommodates characters representing tones higher in pitch than tone E. The lower register section 34 accommodates characters representing tones lower in pitch than tone A 46.

The grid 22 is divided vertically into horizontal intervals 50. The number of the intervals 50 is equal to the number of beats per measure of a musical composition. The characters C through B 54 and H through L 58, are laid out horizontally upon the grid 22 such that the relative timing of the characters is illustrated by the position of the characters with respect to the intervals 50. The characters which occur earlier 62 are placed to the left of subsequently occurring characters 66 and are laid out vertically upon the grid such that characters representing tones of higher pitch 70 are placed above those representing tones of lower pitch 74.

A variation of the invention further divides the grid vertically to indicate a beginning 78 and an end 82 of each measure 86.

Another variation of the invention further divides the grid vertically to indicate a beginning 90 and an end 94 of each half measure 98.

An additional variation of the invention further includes a series of apostrophe markings 102. The markings 102 are located above those characters 106 between which a tone is to be sustained.

An added variation of the invention further includes a series of slash "/" markings 110. The / markings 110 are located in the horizontal intervals 114 in which a rest is to be sustained.

In a further variation of the invention, a trill 118 is indicated by lower case alphabetic characters "tr" 122 located above those characters 126 employed in the trill.

In yet another variation of the invention, as illustrated in FIG. 1, the characters representing tones higher in pitch than the third F above middle C 130, are indicated by lower case alphabetic characters "g" through "f" 134 and "k" through "j" 138. The characters 134 and 138 are located upon the grid 22 beginning at the same vertical displacement as the characters "G" through "F" representing tones beginning with the second G above middle C 142. Characters represented by tones higher in pitch than the fourth F above middle C 146 are indicated by underscored lower case alphabetic characters "g" through "c" 150 and "k" through "l" 154. The underscored characters 150 and 154 are also located upon the grid 22 beginning at the same vertical displacement as the characters "G" through "F" representing tones beginning with the second G above middle C 142.

In still another variation of the invention, the characters representing tones lower in pitch than the third A below middle C 158 are indicated by lower case alphabetic characters "g" through "a" 162 and "j" through "l" 166. The characters 162 and 166 are located upon the grid 22 beginning at the same vertical displacement as the characters "G" through "A" representing tones beginning with the second G below middle C 170.

In a final variation, as illustrated in FIG. 2, tones to be played with the left hand are indicated by characters in bold type 174.

The system of musical notation 10 has been described with reference to particular embodiments. Other modifications and enhancements can be made without departing from the spirit and scope of the claims that follow.

What is claimed is:

1. A system of musical notation comprising:

a series of alphabetic characters C, D, E, F, G, A and B representing tones C through B, respectively;

a series of alphabetic characters H, I, J, K and L representing tones C♯ (D♭), D♯ (E♭), F♯ (G♭), G♭ (A♭) and A♯ (B♭), respectively;

a timing grid, said grid being divided horizontally into an upper register section, a middle register section and a lower register section;

said middle register section accommodating characters A, L, B, C, H, D, I and E, said character C representing the middle C tone of a keyboard instrument;

said upper register section accommodating characters representing tones higher in pitch than tone E;

said lower register section accommodating characters representing tones lower in pitch than tone A;

said grid being divided vertically into horizontal intervals, the number of said intervals being equal to the number of beats per measure of a musical composition; and said characters, C through B and H through L, being disposed horizontally upon said grid such that the relative timing of the characters is illustrated by the position of the characters with respect to the intervals with characters occurring earlier placed to the left of subsequently occurring characters and being disposed vertically upon said grid such that characters representing tones of higher pitch are placed above those representing tones of lower pitch.

2. A system of musical notation as described in claim 1, wherein said grid is further divided vertically to indicate a beginning and an end of each measure.

3. A system of musical notation as described in claim 1, wherein said grid is further divided vertically to indicate a beginning and an end of each half measure.

4. A system of musical notation as described in claim 1 further comprising a series of apostrophe markings, said markings being disposed above those characters between which a tone is to be sustained.

5. A system of musical notation as described in claim 1 further comprising a series of slash / markings, said / markings being disposed in those horizontal intervals in which a rest is to be sustained.

6. A system of musical notation as described in claim 1 wherein a trill is indicated by lower case alphabetic characters tr disposed above those characters employed in the trill.

7. A system of musical notation as described in claim 1 wherein characters representing tones higher in pitch than the third F above middle C are indicated by lower case alphabetic characters g through f and k through j, said characters being disposed upon the grid beginning at the same vertical displacement as the characters G through F representing tones beginning with the second G above middle C and characters represented by tones higher in pitch than the fourth F above middle C are indicated by underscored lower case alphabetic characters g through c and k through l, said underscored characters also being disposed upon the grid beginning at the same vertical displacement as the characters G through F representing tones beginning with the second G above middle C.

8. A system of musical notation as described in claim 1 wherein characters representing tones lower in pitch than the third A below middle C are indicated by bold lower case alphabetic characters g through a and j through 1, said characters being disposed upon the grid beginning at the same vertical displacement as the characters G through A representing tones beginning with the second G below middle C.

9. A system of musical notation as described in claim 1 wherein tones to be played with the left hand are indicated by characters in bold type.

\* \* \* \* \*